(12) United States Patent
Achten et al.

(10) Patent No.: US 12,337,533 B2
(45) Date of Patent: Jun. 24, 2025

(54) METHOD FOR MODIFYING A 3D PRINTED OBJECT

(71) Applicant: STRATASYS INC., Eden Prairie, MN (US)

(72) Inventors: Dirk Achten, Leverkusen (DE); Bettina Mettmann, Pulheim (DE); Thomas Buesgen, Leverkusen (DE); Michael Kessler, Leverkusen (DE)

(73) Assignee: Stratasys, Inc., Minnetonka, MN (US)

( * ) Notice: Subject to any disclaimer, the term of this patent is extended or adjusted under 35 U.S.C. 154(b) by 401 days.

(21) Appl. No.: 17/760,816

(22) PCT Filed: Sep. 25, 2020

(86) PCT No.: PCT/EP2020/076828
§ 371 (c)(1),
(2) Date: Mar. 16, 2022

(87) PCT Pub. No.: WO2021/063806
PCT Pub. Date: Apr. 8, 2021

(65) Prior Publication Data
US 2022/0362991 A1 Nov. 17, 2022

(30) Foreign Application Priority Data
Sep. 30, 2019 (EP) .................... 19200320

(51) Int. Cl.
| | |
|---|---|
| *B29C 64/165* | (2017.01) |
| *B29C 64/268* | (2017.01) |
| *B33Y 10/00* | (2015.01) |
| *B33Y 70/00* | (2020.01) |
| *B29K 75/00* | (2006.01) |
| *B29K 105/00* | (2006.01) |

(52) U.S. Cl.
CPC .......... *B29C 64/165* (2017.08); *B29C 64/268* (2017.08); *B33Y 10/00* (2014.12); *B33Y 70/00* (2014.12); *B29K 2075/00* (2013.01); *B29K 2105/0058* (2013.01); *B29K 2995/007* (2013.01); *B29K 2995/0077* (2013.01)

(58) Field of Classification Search
CPC ..... B29C 64/165; B29C 64/268; B33Y 10/00; B29K 2075/00; B29K 2105/0058; B29K 2995/007; B29K 2995/0077
See application file for complete search history.

(56) References Cited

U.S. PATENT DOCUMENTS

| | | | |
|---|---|---|---|
| 2017/0173872 A1* | 6/2017 | McCall ................. | B29C 64/124 |
| 2019/0030788 A1 | 1/2019 | Erickson et al. | |
| 2019/0374309 A1 | 12/2019 | Parkar et al. | |
| 2019/0375153 A1 | 12/2019 | Achten et al. | |
| 2020/0078831 A1* | 3/2020 | Converse ............... | B33Y 30/00 |

FOREIGN PATENT DOCUMENTS

WO 2018111548 A1 6/2018

OTHER PUBLICATIONS

International Search Report for PCT/EP2020/076828 issued on Dec. 17, 2020 by Authorized officer Fageot, Philippe.

* cited by examiner

*Primary Examiner* — Larry W Thrower
(74) *Attorney, Agent, or Firm* — Faegre Drinker Biddle & Reath LLP

(57) ABSTRACT

The invention relates to a method for modifying an object comprising the step of: I) providing an object which is made at least partially of a construction material comprising a thermoplastic polyurethane. The method also comprises the following steps: II) contacting, at least in part, the construction material, for a first predetermined period of time, with a first liquid comprising ≥80% by weight, based on the total weight of the first liquid, of a polar aprotic solvent; III) contacting, for a second predetermined period of time, the areas of the construction material that were in contact with the liquid in step II) with a second liquid comprising ≥80% by weight, based on the total weight of the second liquid, of a polar protic solvent. Preferably, the first liquid is DMSO or acetone and the second liquid is water.

20 Claims, No Drawings

METHOD FOR MODIFYING A 3D PRINTED OBJECT

CROSS-REFERENCE TO RELATED APPLICATION

This application is a national stage application under 35 U.S.C. § 371 of PCT/EP2020/076828, filed Sep. 25, 2020, which claims the benefit of European Application No. 19200320.0, filed Sep. 30, 2019, each of which is incorporated herein by reference.

FIELD

The present invention relates to a process for modifying an article which is at least partially constructed from a build material comprising a thermoplastic polyurethane. The invention further relates to an article modified by the process.

BACKGROUND

It is known to produce plastics articles in an additive manufacturing process, for example in a powder sintering process, wherein the articles are constructed layerwise. The additive manufacturing processes are also known as 3D printing. Employable starting materials for the articles to be produced in a 3D printing process include for instance polyamides or thermoplastic polyurethane. The use of such plastics for the production of plastics articles in a 3D printing process has the disadvantage that the surface of the articles is porous and therefore on the one hand is subject to elevated wear and on the other hand is comparatively susceptible to adhesion of dirt due to its porous surface structure. The aesthetics of the article may therefore be significantly impaired. The porous surface of the articles may moreover have a negative effect on haptics. Depending on the printed material used the articles may moreover absorb water or moisture which can negatively affect the structure and/or the stability of the articles.

WO 2018/095967 A1 relates to an integrated additive manufacturing process which makes it possible to achieve improved haptics of the produced article while simultaneously improving the adhesion of its coating. This process for producing an at least partially coated article comprises the step of producing the article by means of an additive manufacturing process from a build material, wherein the build material comprises a thermoplastic polyurethane material. The article is at least partially contacted with a preparation selected from: aqueous polyurethane dispersion, aqueous dispersion of an OH-comprising polymer, wherein this dispersion further comprises an NCO-comprising compound or an aqueous preparation of an NCO-comprising compound, wherein this preparation contains no OH-comprising polymers, or a combination of at least two of these.

For cost-sensitive applications the process described in WO 2018/095967 A1 may prove less suitable since for example the aqueous polyurethane dispersion entails additional cost.

WO 2017/196330 A1 discloses a 3D printing process comprising applying a polymeric build material, selectively applying a fusing agent to at least a section of the polymeric build material and selectively applying a mechanical modifier to at least a region of this section. The polymeric build material is irradiated so that the section of the build material fuses to form a layer with the fusing agent. The mechanical modifier forms an assembled layer in the region. This assembled layer differs in one mechanical property from the fused layer that has not come into contact with the mechanical modifier. In one embodiment the mechanical modifier may be a plasticizer liquid comprising a plasticizer and the assembled layer has a higher ductility than the fused layer that has not come into contact with the mechanical modifier. The plasticizer liquid may contain a plasticizer and a solvent. Dimethyl sulfoxide (DMSO) may be mentioned as an example of both a plasticizer and a solvent. Acetone is a further example of a solvent.

WO 2018/119026 describes a process for producing an article comprising the steps of: (i) providing a printable composition comprising (a) 1% to 50% by weight, inclusive, of a polymer, (b) 5% to 50% by weight, inclusive, of a polymerizable component, (c) 10% to 80% by weight, inclusive, of a temporary solvent, (d) 0.1% to 5% by weight, inclusive, of a photoinitiator and (e) an optional inhibitor in an amount of 0.001% to 1% by weight inclusive; (ii) selectively curing the printable composition to form a gel body; (iii) at least partially removing the temporary solvent from the gel body and (iv) optionally curing unpolymerized residues of polymerizable composition which are present before or after step (iii).

SUMMARY

It is an object of the present invention to modify an article comprising a thermoplastic polyurethane (TPU) such that at least the TPU-comprising sections of the article have improved mechanical properties and a surface which has more pleasant haptics and especially is smoother.

The object is achieved in accordance with the invention by a process according to claim 1 and an article according to claim 14. Advantageous developments are specified in the subsidiary claims. They may be combined as desired unless the opposite is clear from the context.

A process for modifying an article comprises the step of:
I) providing an article which is at least partially constructed from a build material comprising a thermoplastic polyurethane.

The process further comprises the steps of:
II) at least partially contacting the build material for a first predetermined duration with a first liquid which contains ≥80% by weight based on the total weight of the first liquid of a polar aprotic solvent;
III) contacting for a second predetermined duration the regions of the build material contacted with the first liquid in step II) with a second liquid which contains ≥80% by weight based on the total weight of the second liquid of a polar protic solvent.

An article modified by the process according to the invention has at the sections containing the build material a smoother surface than a corresponding unmodified article. Tensile strength and breaking elongation are also increased compared to the untreated build material.

It has further surprisingly been shown that despite a swelling effect which the first liquid such as for example DMSO may have on the build material the first liquid may be removed from the article again by the second liquid such as for example water to such an extent that the first liquid remains as a residue in the modified article in a weight fraction of <5%, preferably <3%, particularly preferably <1% and very particularly preferably <0.5% (in each case based on the total weight of the build material).

The thermoplastic polyurethane is preferably elastic, i.e. has a breaking elongation in the tensile test according to DIN 53504 of ≥50%. In addition, the material may have for example a compression set after 25% compression (DIN 53517) of ≤10% absolute.

A suitable thermoplastic polyurethane elastomer may be obtained from the reaction of at least the following components:

a) at least one organic diisocyanate, preferably 1,6-hexamethylene diisocyanate, 1,4-cyclohexane diisocyanate, isophorone diisocyanate, dicyclohexylmethane diisocyanate, diphenylmethane diisocyanate isomer mixtures, 4,4'-diphenylmethane diisocyanate, 1,5-naphthylene diisocyanate and mixtures of at least two of the abovementioned components;

b) at least one compound having isocyanate-reactive groups and having a number-average molecular weight ($M_n$) of ≥500 g/mol to ≤6000 g/mol and a number-average functionality of the entirety of the components at b) of ≥1.8 to ≤2.5, preferably polyester polyols, polyether polyols, polycarbonate polyols, polyester polyamides and mixtures of at least two of the abovementioned components;

c) at least one chain extender having a molecular weight ($M_n$) of 60-450 g/mol and a number-average functionality of the entirety of the chain extenders at c) of 1.8 to 2.5, preferably ethanediol, 1,4-butanediol, 1,6-hexanediol, 1,4-di((3-hydroxyethyl)hydroquinone, 1,4-di((3-hydroxyethyl) bisphenol A and mixtures of at least two of the abovementioned components.

The production of the article provided in step I) is preferably already complete prior to step I). Steps II) and III) are then employed not intermediately during for example 3D printing but only subsequently.

According to step II) of the process the build material is at least partially contacted with a first liquid for a first predetermined duration. This first liquid contains ≥80% by weight, preferably ≥80% by weight to ≤100% by weight and more preferably ≥95% by weight to ≤100% by weight (in each case based on the total weight of the first liquid) of a polar aprotic solvent. This includes compounds having low-acidity H atoms, comparatively high dielectric constants and comparatively high dipole moments. Examples of polar aprotic solvents are dichloromethane, N-methylpyrrolidone, tetrahydrofuran, ethyl acetate, acetone, N,N-dimethylformamide, acetonitrile, dimethyl sulfoxide, methyl ethyl ketone and propylene carbonate. Mixtures of at least two of the aforementioned solvents are likewise conceivable.

The first predetermined duration may be in the range of seconds or minutes. It may be for example ≥1 second to ≤30 minutes. Without wishing to be tied to a particular theory it is thought that the first liquid penetrates at least into near-surface regions of the contacted article and there via swelling and partial dissolution processes brings about a smoothing and consolidation.

According to step III) of the process the regions of the build material contacted with the first liquid in step II) are contacted with a second liquid for a second predetermined duration. This second liquid contains ≥80% by weight, preferably ≥80% by weight to ≤100% by weight and more preferably ≥95% by weight to ≤100% by weight (in each case based on the total weight of the first liquid) of a polar protic solvent. The contacting need not be restricted to those regions previously contacted with the first liquid. For simplification of the process it may be provided for example that the entire article is immersed in the second liquid or rinsed under a running second liquid (for example running water). Examples of suitable polar protic solvents are formic acid, n-butanol, n-propanol, isopropanol, nitromethane, ethanol, methanol, acetic acid and water.

The second predetermined duration may be in the range of seconds or minutes. It may be for example ≥1 second to ≤30 minutes.

After step III) the article may be freed of adhering residues of the second liquid for example by drying at room temperature, by drying at elevated temperature, by applying a vacuum, by contacting with an absorbent article or by a combination of these measures.

Steps II) and/or III) may be performed two or more times. It is likewise possible to repeatedly perform the sequence of II) and III) or else to independently repeatedly perform II) and/or III). It is preferable when in the individual steps II) and/or III) the boiling point of the first and/or second liquid falls. Thus in a first step II) DMSO may be used as the first liquid and in a second step II) acetone may be used as the first liquid.

In one embodiment of the process the polar aprotic solvent in the first liquid is acetone, methyl ethyl ketone, dimethyl sulfoxide or a mixture thereof.

In a further embodiment of the process the first liquid further contains water, a polyisocyanate, a polyol or a mixture of at least two of the abovementioned components. This makes it possible to achieve a postcrosslinking of the polyurethane material where the first liquid contacted the article and penetrated into the article. Urethanization catalysts may likewise be present in the first liquid. Preferred polyisocyanates are 1,6-hexamethylene diisocyanate, 1,4-cyclohexane diisocyanate, isophorone diisocyanate, dicyclohexylmethane diisocyanate, diphenylmethane diisocyanate isomer mixtures, 4,4'-diphenylmethane diisocyanate, 1,5-naphthylene diisocyanate and polyisocyanates obtainable from the reaction of at least two of the recited isocyanates with one another or with another reactive compound such as isocyanate trimers, isocyanate dimers, isocyanate oligomers, isocyanate-functional allophanates, isocyanate-functional biurets, isocyanate-functional ureas and mixtures of at least two of the abovementioned components. Preferred polyols are polyester polyols, polyether polyols, polycarbonate polyols, polyester polyamides and mixtures of at least two of the abovementioned components. Contemplated urethanization catalysts preferably include tin octoate, tin dioctoate, zinc dioctoate, dibutyltin dilaurate, dimethylbis [(1-oxoneodecyl)oxy]stannane, dimethyltin dicarboxylate, zirconium bis(ethylhexanoate), zirconium acetylacetonate, or tertiary amines such as 1,4-diazabicyclo[2.2.2]octane, diazabicyclononane, diazabicycloundecane, 1,1,3,3-tetramethylguanidine and 1,3,4,6,7,8-hexahydro-1-methyl-2H-pyrimido(1,2-a)pyrimidine.

In a further embodiment of the process the polar protic solvent in the second liquid is water, methanol, ethanol, n-propanol, isopropanol or a mixture of at least two of the abovementioned components. Preference is given to water and very particular preference to the combination of water as a polar protic solvent with acetone or DMSO as a polar aprotic solvent.

In a further embodiment of the process in step II) the first predetermined duration is ≥1 second to ≤120 seconds. Preference is given to times from ≥5 seconds to ≤90 seconds and more preferably ≥30 seconds to ≤60 seconds. Alternatively or in addition in step III) the second predetermined duration is ≥1 second to ≤120 seconds. Preference is given to times from ≥5 seconds to ≤90 seconds and more preferably ≥30 seconds to ≤60 seconds.

Step III) may be followed by storage of the article at room temperature (20° C. to 23° C.) to allow any post-crosslinking reactions to proceed further before the article is for example packaged or employed. Such storage preferably lasts at least 24 hours.

In a further embodiment of the process step III) is followed by heating of the article to a temperature of ≥50° C. for a predetermined duration. The predetermined duration is preferably ≥10 minutes and more preferably ≥20 minutes. It is more preferable when the temperature is ≥100° C. Particular preference is given to heating to ≥100° C. to ≤150° C. for ≥10 minutes to ≤60 minutes. This embodiment is particularly advantageous when the first liquid contains a polyol and/or a polyisocyanate. Post-crosslinking reactions can then be accelerated. The same applies when the second liquid contains water.

In a further embodiment of the process the regions of the article contacted with the solvent in step II) have a porosity $\Phi$ of ≥0.01 to ≤0.6 and the porosity $\Phi$ is expressed as:

$$\Phi = 1-(\rho/\rho_0)$$

wherein $\rho$ represents the density of the volume assigned to the sections of the article that are contacted with the solvent and $\rho_0$ represents the true density of the build material.

The porosity $\Phi$ is preferably ≥0.1 to ≤0.5 and more preferably ≥0.2 to ≤0.4. In the case of such porous volumes the first liquid may also penetrate into the interior of the volume to a greater extent and there too result in modification of the mechanical properties of the article. In the powder sintering process the porosity of the 3D-printed article may be controlled within certain limits by means of an intentionally lower output of the laser used for sintering.

In a further embodiment of the process the article was at least partially produced by means of an additive manufacturing process using the build material.

In a further embodiment the additive manufacturing process comprises the steps of:
  applying a layer of particles comprising the build material to a target surface;
  energizing a selected portion of the layer corresponding to a cross section of the article to join the particles in the selected portion;
  repeating the steps of applying and energizing for a plurality of layers so that the joined portions of the adjacent layers become joined to form the article.

This embodiment concerns a powder sintering or powder melting process. If the number of repetitions for applying and irradiating is sufficiently low the article to be constructed may also be referred to as a two-dimensional article. Such a two-dimensional article can also be characterized as a coating. Construction thereof may comprise performing for example ≥2 to ≤20 repetitions for application and irradiation.

It is preferable when at least 90% by weight of the particles have a particle diameter of ≤0.25 mm, preferably ≤0.2 mm, particularly preferably ≤0.15 mm. The energy source for joining the particles may be electromagnetic energy, for example UV to IR light. An electron beam is also conceivable. The joining of the particles in the irradiated portion of the particle layer is typically effected through (partial) melting of a (semi-)crystalline material and joining of the material in the course of cooling. However it is also possible that other transformations of the particles such as a glass transition, i.e. the heating of the material to a temperature above the glass transition temperature, bring about a joining of the particles to one another.

In a further embodiment the energizing of a selected portion of the layer corresponding to a cross section of the article to join the particles in the selected portion comprises the step of:
  irradiating a selected portion of the layer corresponding to a cross section of the article with an energy beam to join the particles in the selected portion.

This form of the process can be regarded as a selective sintering process, especially as a selective laser sintering process (SLS). The energy beam for joining the particles may be a beam of electromagnetic energy, for example a "light beam" of UV to IR light. The energy beam is preferably a laser beam, more preferably having a wavelength between 600 nm and 15 µm. The laser may take the form of a semiconductor laser or of a gas laser. An electron beam is also conceivable.

In a further embodiment the energizing of a selected portion of the layer corresponding to a cross section of the article to join the particles in the selected portion comprises the steps of:
  applying a liquid to a selected portion of the layer corresponding to a cross section of the article, wherein the liquid increases the absorption of energy in the regions of the layer contacted by it relative to the regions not contacted by it;
  irradiating the layer so that the particles in regions of the layer contacted by the liquid are joined to one another and the particles in regions of the layer not contacted by the liquid are not joined to one another.

This embodiment may comprise for example applying a liquid containing an IR absorber onto the layer using inkjet processes. The irradiation of the layer leads to selective heating of those particles that are in contact with the liquid including the IR absorber. This makes it possible to achieve a joining of the particles. It is optionally also possible to use a second liquid that is complementary to the energy-absorbing liquid in terms of its behavior toward the energy used. In regions where the second liquid is applied the employed energy is not absorbed but rather reflected. The regions beneath the second liquid are thus shaded. This makes it possible to increase the separation sharpness between regions of the layer that are to be melted and regions of the layer that are not to be melted.

In a further embodiment the additive manufacturing process comprises the steps of:
  applying a filament of the at least partially molten build material to a carrier, such that a layer of the build material is obtained, corresponding to a first selected cross section of the article;
  applying a filament of the at least partially molten build material onto a previously applied layer of the build material to obtain a further layer of the build material which corresponds to a further selected cross section of the article and which is joined to the previously applied layer;
  repeating the step of applying a filament of the at least partially molten build material onto a previously applied layer of the build material until the article has been formed.

This embodiment is a melt coating or fused deposition modeling (FDM) process. If the number of repetitions for the applying is sufficiently low, the article to be constructed may also be referred to as a two-dimensional article. Such a two-dimensional article can also be characterized as a coating. For example construction thereof may comprise performing ≥2 to ≤20 repetitions for the applying.

The individual filaments which are applied may have a diameter of ≥30 μm to ≤2000 μm, preferably ≥40 μm to ≤1000 μm and particularly preferably ≥50 μm to ≤500 μm.

The first step of this embodiment of the process relates to the construction of the first layer on a carrier. The second step in which further layers are applied to previously applied layers of the build material is subsequently performed until the desired result in the form of the article is obtained. The at least partially molten build material joins with existing layers of the material to construct a structure in the z direction.

In a further preferred embodiment of the process the build material comprises a thermoplastic polyurethane elastomer which
has a melting range (DSC, differential scanning calorimetry; second heating at heating rate 5 K/min) of ≥20° C. to ≤240° C. (preferably ≥40° C. to ≤220° C., more preferably ≥70° C. to ≤200° C.),
has a Shore hardness according to DIN ISO 7619-1 of ≥40 A to ≤85 D (preferably ≥50 Shore A to ≤80 Shore D, more preferably ≥60 Shore A to ≤75 Shore D),
has a melt volume rate (MVR) according to ISO 1133 (10 kg) at a temperature T of 5 to 15 (preferably ≥6 to ≤12, more preferably ≥7 to ≤10) cm³/10 min and
exhibits a change in the melt volume rate (10 kg) at an increase of this temperature T by 20° C. of ≤90 (preferably ≤70, more preferably ≤50) cm³/10 min.

In the DSC measurement, the material is subjected to the following temperature cycle: 1 minute at minus 60° C., then heating to 220° C. at 20 kelvin/minute, then cooling to minus 60° C. at 5 kelvin/minute, then 1 minute at minus 60° C., then heating to 220° C. at 20 kelvin/minute.

This thermoplastic polyurethane elastomer exhibits uniform melting characteristics. Melting characteristics are determined via the change in MVR (melt volume rate) according to ISO 1133 with a preheating time of 5 minutes and 10 kg load as a function of temperature. Melting characteristics are considered to be "uniform" when the MVR at a starting temperature $T_x$ has a starting value of 5 to 15 cm³/10 min and increases by not more than 90 cm³/10 min as a result of an increase in temperature by 20° C. to $T_{x+20}$.

In a further embodiment of the process the build material comprises a thermoplastic polyurethane elastomer which has a melting range (DSC, differential scanning calorimetry; 2nd heating at a heating rate of 5 K/min) of ≥20° C. to ≤100° C. and a magnitude of complex viscosity $|\eta^*|$ (determined by viscometry measurement in the melt with a plate/plate oscillation shear viscometer at 100° C. and an angular frequency of 1/s) of ≥10 Pas to ≤1 000 000 Pas.

This thermoplastic elastomer has a melting range of ≥20° C. to ≤100° C., preferably of ≥25° C. to ≤90° C. and more preferably of ≥30° C. to ≤80° C. In the DSC measurement for determination of the melting range, the material is subjected to the following temperature cycle: 1 minute at −60° C., then heating to 200° C. at 5 kelvin/minute, then cooling to −60° C. at 5 kelvin/minute, then 1 minute at −60° C., then heating to 200° C. at 5 kelvin/minute.

It is possible that the temperature interval between the start of the melting operation and the end of the melting operation as determinable by the above DSC protocol is ≤20° C., preferably ≤10° C. and more preferably ≤5° C.

This thermoplastic elastomer further has a magnitude of complex viscosity $|\eta^*|$ (determined by viscometry measurement in the melt with a plate/plate oscillation viscometer according to ISO 6721-10:2015-09 at 100° C. and an angular frequency of 1/s) of ≥10 Pas to ≤1 000 000 Pas. $|\eta^*|$ is preferably ≥100 Pas to ≤500 000 Pas, more preferably ≥1000 Pas to ≤200 000 Pas.

The magnitude of complex viscosity $|\eta^*|$ describes the ratio of the viscoelastic moduli G' (storage modulus) and G" (loss modulus) to the excitation frequency ω in a dynamic-mechanical material analysis:

$$|\eta^*| = \sqrt{\left[\left(\frac{G'}{\omega}\right)^2 + \left(\frac{G''}{\omega}\right)^2\right]} = \frac{|G'^*|}{\omega}$$

In a further embodiment of the process the build material comprises a thermoplastic polyurethane elastomer obtainable from the reaction of a polyisocyanate component and a polyol component, wherein the polyol component comprises a polyester polyol having a no-flow point (ASTM D5985) of ≥25° C.

Optionally also employable as chain extenders in the reaction to afford this polyurethane are diols in the molecular weight range from ≥62 to ≤600 g/mol.

This polyisocyanate component may comprise a symmetric polyisocyanate and/or a nonsymmetric polyisocyanate. Examples of symmetric polyisocyanates are 4,4'-MDI and HDI.

In the case of nonsymmetric polyisocyanates, the steric environment of one NCO group in the molecule is different than the steric environment of a further NCO group. One isocyanate group then reacts more quickly with isocyanate-reactive groups, for example OH groups, while the remaining isocyanate group is less reactive. One consequence of the nonsymmetric construction of the polyisocyanate is that the polyurethanes formed with these polyisocyanates also have a less linear structure.

Preference is given to 4,4'-MDI or a mixture containing IPDI and HDI and/or PDI as the polyisocyanate component.

This polyol component has a polyester polyol having a no-flow point (ASTM D5985) of ≥25° C., preferably ≥35° C., more preferably ≥35° C. to ≤55° C. To determine the no-flow point a test vessel containing the sample is set into slow rotation (0.1 rpm). A flexibly mounted measuring head is immersed in the sample and, on attainment of the no-flow point, is moved away from its position as a result of the abrupt increase in viscosity; the resulting tipping motion triggers a sensor.

Examples of polyester polyols which can have such a no-flow point are reaction products of phthalic acid, phthalic anhydride or symmetric α,ω-$C_4$- to $C_{10}$-dicarboxylic acids with one or more $C_2$- to $C_{10}$-diols. They preferably have a number-average molecular weight $M_n$ of ≥400 g/mol to ≤6000 g/mol. Suitable diols are especially monoethylene glycol, 1,4-butanediol, 1,6-hexanediol and neopentyl glycol.

Preferred polyester polyols are specified hereinafter, stating their acid and diol components: adipic acid+monoethylene glycol; adipic acid+monoethylene glycol+butane-1,4-diol; adipic acid+butane-1,4-diol; adipic acid+hexane-1,6-diol+neopentyl glycol; adipic acid+hexane-1,6-diol; adipic acid+butane-1,4-diol+hexane-1,6-diol; phthalic acid (anhydride)+monoethylene glycol+trimethylolpropane; phthalic acid (anhydride)+monoethylene glycol.

Particular preference is given to the combination of a mixture comprising IPDI and HDI as polyisocyanate component with a polyesterpolyol formed from adipic acid+butane-1,4-diol+hexane-1,6-diol for formation of the polyurethanes.

The following combination is preferred in the process according to the invention:
 selective laser sintering process for production of the article;
 build material containing polyurethane obtainable from the reaction of a polyisocyanate component and a polyol component, wherein the polyisocyanate component comprises an HDI and IPDI and wherein the polyol component comprises a polyesterpolyol which is obtainable from the reaction of a reaction mixture comprising adipic acid and also hexane-1,6-diol and butane-1,4-diol with a molar ratio of these diols of $\geq 1:4$ to $\leq 4:1$ and which has a number-average molecular weight $M_n$ (GPC, against polystyrene standards) of $\geq 4000$ g/mol to $\leq 6000$ g/mol.

The following combination is likewise preferred in the process according to the invention:
 fused deposition modeling process for producing the article;
 build material containing polyurethane obtainable from the reaction of a polyisocyanate component and a polyol component, wherein the polyisocyanate component comprises an HDI and IPDI and wherein the polyol component comprises a polyesterpolyol which is obtainable from the reaction of a reaction mixture comprising adipic acid and also hexane-1,6-diol and butane-1,4-diol with a molar ratio of these diols of $\geq 1:4$ to $\leq 4:1$ and which has a number-average molecular weight $M_n$ (GPC, against polystyrene standards) of $\geq 4000$ g/mol to $\leq 6000$ g/mol.

The following combination is likewise preferred in the process according to the invention:
 selective laser sintering process for production of the article;
 build material containing polyurethane obtainable from the reaction of a polyisocyanate component and a polyol component, wherein the polyisocyanate component comprises an MDI (preferably 4,4'-MDI) and wherein the polyol component comprises a polyesterpolyol which is obtainable from the reaction of a reaction mixture comprising adipic acid and also hexane-1,6-diol and butane-1,4-diol with a molar ratio of these diols of $\geq 1:4$ to $\leq 4:1$ and which has a number-average molecular weight $M_n$ (GPC, against polystyrene standards) of $\geq 4000$ g/mol to $\leq 6000$ g/mol.

The following combination is likewise preferred in the process according to the invention:
 fused deposition modeling process for producing the article;
 build material containing polyurethane obtainable from the reaction of a polyisocyanate component and a polyol component, wherein the polyisocyanate component comprises an MDI (preferably 4,4'-MDI) and wherein the polyol component comprises a polyesterpolyol which is obtainable from the reaction of a reaction mixture comprising adipic acid and also hexane-1,6-diol and butane-1,4-diol with a molar ratio of these diols of $\geq 1:4$ to $\leq 4:1$ and which has a number-average molecular weight $M_n$ (GPC, against polystyrene standards) of $\geq 4000$ g/mol to $\leq 6000$ g/mol.

The invention further relates to an at least partially modified article obtained by a process according to the invention. In one embodiment the sections of the article which have been modified by the process according to the invention have a higher tensile strength (DIN 53504) and/or a higher breaking elongation (DIN 53504) than corresponding sections on an unmodified but otherwise identical article.

EXAMPLES

The present invention is more particularly elucidated with reference to the following examples without, however, being limited thereto.

The examples employed the following thermoplastic polyurethane materials:

| Example no. | Material |
|---|---|
| 1 | Ester-based TPU having a Shore D hardness of 59 (measured on an injection-molded specimen according to DIN ISO 7619-1, 1 second test time) and a glass transition temperature of about −13° C. (measured on an injection-molded specimen based on DIN ISO 671-1, frequency 1 Hz) |
| 2 | Luvosint X92 A-2 (Lehmann & Voss). Ester-based TPU. According to the data in the datasheet this material had a glass transition temperature (ISO 6721-1) of −13.6° C., a melt volume rate MVR 190° C./2.16 kg (ISO 1133) of 18 cm$^3$/min and a Shore A hardness (ISO 868) of a laser-sintered component of 88. |
| 3 | Ether-based TPU having a Shore A hardness of 72 (measured on a laser-sintered specimen according to DIN ISO 7619-1, 3 second test time) and a glass transition temperature of about −37° C. (measured on an injection-molded specimen based on DIN ISO 671-1, frequency 1 Hz) |
| 4 | Ether-based TPU having a Shore D hardness of 70-74 (measured on an injection-molded specimen according to DIN ISO 7619-1, 1 second test time) and a glass transition temperature of about 60° C. (measured on an injection-molded specimen based on DIN ISO 671-1, frequency 1 Hz) |
| 5 | Ether-based TPU having a Shore D hardness of 65 (measured on a laser-sintered specimen according to DIN ISO 7619-1, 1 second test time) and a glass transition temperature of about 60° C. (measured on an injection-molded specimen based on DIN ISO 671-1, frequency 1 Hz) |

The TPU materials were processed into S2 test specimens. These test specimens were produced on a powder SLS apparatus or in the case of Example 4 on an FDM apparatus.

In the individual examples test specimens were subjected to visual and haptic assessment in respect of their surface quality. In addition, tensile strengths and breaking elongations were determined in a tensile test according to DIN 53504. After determination of starting values ("zero values") the test specimens were immersed in acetone or dimethyl sulfoxide for the times indicated, subsequently rinsed with water and then dried at 30° C. over 24 hours in a recirculating air drying cabinet. The thus treated test specimens were again subjected to visual and haptic assessment in respect of their surface quality and tensile strengths and breaking elongations were determined.

The scale for evaluating the surfaces of the printed test specimens was as follows:

| | |
|---|---|
| 0 | Starting state: rough, powdery, leaves powder particles behind |
| 1 | rough, no longer any loose powder |
| 2 | no longer as rough as starting state, no longer any loose powder |
| 3 | feels slightly smoothed, powder structure still recognizable on surface, no longer any loose powder |
| 4 | Surface feels almost smooth, no longer any loose powder |
| 5 | Surface feels completely smooth, no structure and no longer any loose powder |

| Example no. | Solvent | Immersion time [s] | Value according to scale |
|---|---|---|---|
| 1 | Acetone | 30 | 1 |
| 1 | DMSO | 30 | 3 |
| 2 | Acetone | 30 | 1 |
| 2 | DMSO | 30 | 3 |
| 3 | Acetone | 30 | 2 |
| 3 | DMSO | 30 | 5 |
| 5 | Acetone | 30 | 1 |
| 5 | DMSO | 30 | 5 |

In all examples the assessment of the test specimen for the zero value was "0".

Example 1

| Solvent | Immersion time [s] | Tensile strength [N/mm$^2$] | Change in tensile strength from zero value [%] | Breaking elongation [%] | Change in breaking elongation from zero value [%] |
|---|---|---|---|---|---|
| Zero value | | 2.21 | | 14.4 | |
| Acetone | 30 | 2.57 | 16.29 | 18.89 | 31.18 |
| | 60 | 2.35 | 6.33 | 18.49 | 28.40 |
| DMSO | 15 | 2.53 | 14.48 | 24.67 | 71.32 |
| | 30 | 2.44 | 10.41 | 20.21 | 40.35 |
| | 45 | 2.6 | 17.65 | 24.19 | 67.99 |
| | 60 | 2.82 | 27.60 | 28.16 | 95.56 |

Example 2

| Solvent | Immersion time [s] | Tensile strength [N/mm$^2$] | Change in tensile strength from zero value [%] | Breaking elongation [%] | Change in breaking elongation from zero value [%] |
|---|---|---|---|---|---|
| Zero value | | 2.81 | | 74.18 | |
| Acetone | 30 | 3.06 | 8.90 | 98.33 | 32.56 |
| | 60 | 3.44 | 22.42 | 98.11 | 32.26 |
| DMSO | 30 | 3.13 | 11.39 | 118.23 | 59.38 |
| | 45 | 3.57 | 27.05 | 109.88 | 48.13 |
| | 60 | 3.32 | 18.15 | 121.46 | 63.74 |

Example 3

| Solvent | Immersion time [s] | Tensile strength [N/mm$^2$] | Change in tensile strength from zero value [%] | Breaking elongation [%] | Change in breaking elongation from zero value [%] |
|---|---|---|---|---|---|
| Zero value | | 3.06 | | 119.32 | |
| Acetone | 30 | 3.19 | 4.25 | 145.46 | 21.91 |
| DMSO | 15 | 3.34 | 9.15 | 134.25 | 12.51 |
| | 30 | 3.63 | 18.63 | 147.47 | 23.59 |

Example 4

| Solvent | Immersion time [s] | Tensile strength [N/mm$^2$] | Change in tensile strength from zero value [%] | Breaking elongation [%] | Change in breaking elongation from zero value [%] |
|---|---|---|---|---|---|
| Zero value | | 4.65 | | 4.44 | |
| DMSO | 15 | 5.58 | 20.00 | 8.6 | 93.69 |
| | 30 | 5.18 | 11.40 | 7.36 | 65.77 |
| | 45 | 5.58 | 20.00 | 7.4 | 66.67 |

Example 5

| Solvent | Immersion time [s] | Tensile strength [N/mm$^2$] | Change in tensile strength from zero value [%] | Breaking elongation [%] | Change in breaking elongation from zero value [%] |
|---|---|---|---|---|---|
| Zero value | | 2.54 | | 3.82 | |
| Acetone | 30 | 2.81 | 10.63 | 4.41 | 15.45 |
| DMSO | 15 | 2.55 | 0.39 | 18.78 | 391.62 |
| | 30 | 2.62 | 3.15 | 13.99 | 266.23 |
| | 45 | 2.8 | 10.24 | 17.98 | 370.68 |
| | 60 | 2.41 | −5.12 | 19.38 | 407.33 |

The invention claimed is:

1. A process for modifying an article comprising:
   I) providing an article which is at least partially constructed from a build material comprising a thermoplastic polyurethane;
   II) at least partially contacting the build material for a first predetermined duration with a first liquid including >80% by weight of a polar aprotic solvent based on a total weight of the first liquid;
   III) contacting for a second predetermined duration regions of the build material contacted with the first liquid in step II) with a second liquid including >80% by weight of a polar protic solvent based on a total weight of the second liquid;
   wherein a section of the article modified by the process has a higher tensile strength according to DIN 53504 or a higher breaking elongation according to DIN 53504 than a corresponding section on an unmodified but otherwise identical article.

2. The process as claimed in claim 1, wherein the polar aprotic solvent in the first liquid comprises acetone, methyl ethyl ketone, dimethyl sulfoxide, or a mixture thereof.

3. The process as claimed in claim 1, wherein the first liquid further includes water, a polyisocyanate, a polyol, or a mixture of at least two of the preceding liquids.

4. The process as claimed in claim 1, wherein the polar protic solvent in the second liquid includes water, methanol, ethanol, n-propanol, isopropanol, or a mixture of at least two of the preceding liquids.

5. The process as claimed in claim 1, wherein in step II) the first predetermined duration is >1 second to ≤120 seconds and/or wherein in step III) the second predetermined duration is ≥1 second to ≤120 seconds.

6. The process as claimed in claim 1, further comprising heating the article to a temperature of ≥50° C. for a predetermined duration after step III).

7. The process as claimed in claim 1, wherein the regions of the build material contacted with the solvent in step II) have a porosity Φ of ≥0.01 to ≤0.6 and the porosity Φ is expressed as:

$$\Phi = 1 - (\rho/\rho_0)$$

wherein ρ represents the density of the volume assigned to the regions of the article that are contacted with the solvent and ρo represents the true density of the build material.

8. The process as claimed in claim 1, wherein the article is at least partially produced by means of an additive manufacturing process using the build material.

9. The process as claimed in claim 8, wherein the additive manufacturing process comprises the steps of:
applying a layer of particles comprising the build material to a target surface;
energizing a selected portion of the layer corresponding to a cross section of the article to join the particles in the selected portion;
repeating the steps of applying and energizing for a plurality of layers so that the selected portions of adjacent layers become joined to form the article.

10. The process as claimed in claim 9, wherein the energizing comprises:
irradiating the selected portion of the layer with an energy beam to join the particles in the selected portion.

11. The process as claimed in claim 9, wherein the energizing comprises:
applying a liquid to the selected portion of the layer, wherein the liquid increases absorption of energy in regions of the layer contacted by the liquid relative to regions of the layer not contacted by the liquid;
irradiating the layer so that the particles in regions of the layer contacted by the liquid are joined to one another and the particles in regions of the layer not contacted by the liquid are not joined to one another.

12. The process as claimed in claim 8, wherein the additive manufacturing process comprises the steps of:
applying a filament of the at least partially molten build material to a carrier, such that a layer of the build material is obtained, corresponding to a first selected cross section of the article;
applying a filament of the at least partially molten build material onto a previously applied layer of the build material to obtain a further layer of the build material which corresponds to a further selected cross section of the article and which is joined to the previously applied layer;
repeating the step of applying a filament of the at least partially molten build material onto a previously applied layer of the build material until the article has been formed.

13. The process as claimed in claim 1, wherein the build material comprises a thermoplastic polyurethane elastomer which has a melting range (DSC, differential scanning calorimetry; second heating at a heating rate of 5 K/min) of ≥20° C. to ≤240° C.,
has a Shore A hardness according to DIN ISO 7619-1 of >40 A to ≤85 D, has a melt volume rate (MVR) according to ISO 1133 (10 kg) at a temperature T of 5 to 15 cm³/10 min, and exhibits a change in the melt volume rate (10 kg) at an increase of temperature T by 20° C. of ≤90 cm³/10 min.

14. The process as claimed in claim 1, wherein in step II) the first predetermined duration is ≥5 seconds to ≤90 seconds and/or wherein in step III) the second predetermined duration is >5 seconds to ≤90 seconds.

15. The process as claimed in claim 1, wherein in step II) the first predetermined duration is ≥30 seconds to ≤60 seconds and/or wherein in step III) the second predetermined duration is ≥30 seconds to ≤60 seconds.

16. The process as claimed in claim 1, wherein the build material comprises an ester-based thermoplastic polyurethane elastomer which has a Shore D hardness according to DIN ISO 7619-1 of 59.

17. The process as claimed in claim 1, wherein the build material comprises an ester-based thermoplastic polyurethane elastomer which has a Shore A hardness according to DIN ISO 7619-1 of 88.

18. The process as claimed in claim 1, wherein the build material comprises an ether-based thermoplastic polyurethane elastomer which has a Shore A hardness according to DIN ISO 7619-1 of 72.

19. The process as claimed in claim 1, wherein the build material comprises an ester-based thermoplastic polyurethane elastomer which has a Shore D hardness according to DIN ISO 7619-1 of 65.

20. The process as claimed in claim 1, wherein the process results in an increase in the tensile strength of the section of the article by at least 10%, as determined by a tensile test according to DIN 53504 or an increase in the breaking elongation of the section of the article by at least 10%, as determined by a tensile test according to DIN 53504.

* * * * *